(12) United States Patent
Eickhoff

(10) Patent No.: US 8,822,097 B2
(45) Date of Patent: Sep. 2, 2014

(54) SLIDE VALVE FOR FUEL CELL POWER GENERATOR

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/606,758

(22) Filed: Nov. 30, 2006

(65) Prior Publication Data

US 2008/0131738 A1 Jun. 5, 2008

(51) Int. Cl.
*H01M 8/04* (2006.01)
*H01M 8/06* (2006.01)

(52) U.S. Cl.
USPC ............ 429/443; 429/408; 429/416; 429/446

(58) Field of Classification Search
USPC ......................................... 251/237; 123/74 D
See application file for complete search history.

(56) References Cited

U.S. PATENT DOCUMENTS

| | | | | |
|---|---|---|---|---|
| 3,765,946 | A | * | 10/1973 | Werner et al. ................... 429/13 |
| 3,994,697 | A | * | 11/1976 | Burke .............................. 44/321 |
| 4,138,089 | A | * | 2/1979 | McCarthy ........................ 251/61 |
| 4,155,712 | A | | 5/1979 | Taschek |
| 4,261,955 | A | | 4/1981 | Bailey, Jr. et al. |
| 4,629,664 | A | | 12/1986 | Tsukui et al. |
| 4,872,472 | A | * | 10/1989 | Lefevre et al. .............. 137/116.3 |
| 5,372,617 | A | | 12/1994 | Kerrebrock et al. |
| 5,992,857 | A | | 11/1999 | Ueda et al. |
| 6,093,501 | A | | 7/2000 | Werth |
| 6,265,093 | B1 | * | 7/2001 | Surampudi et al. ............. 429/13 |
| 6,303,244 | B1 | * | 10/2001 | Surampudi et al. ............. 429/17 |
| 6,413,665 | B1 | * | 7/2002 | Blanchet et al. ................ 429/37 |
| 6,432,566 | B1 | | 8/2002 | Condit et al. |
| 6,508,195 | B1 | | 1/2003 | Tipaldo |
| 7,527,885 | B2 | | 5/2009 | Toukura |
| 8,283,079 | B2 | | 10/2012 | Eickhoff et al. |
| 8,557,479 | B2 | | 10/2013 | Eickhoff et al. |
| 2003/0235728 | A1 | | 12/2003 | Van Zee et al. |
| 2004/0209133 | A1 | | 10/2004 | Hirsch et al. |
| 2005/0022883 | A1 | * | 2/2005 | Adams et al. ............ 137/614.03 |
| 2005/0079128 | A1 | | 4/2005 | DeVos et al. |
| 2005/0118469 | A1 | | 6/2005 | Leach et al. |
| 2005/0136300 | A1 | | 6/2005 | Dyer |
| 2005/0158595 | A1 | * | 7/2005 | Marsh et al. .................... 429/19 |
| 2005/0181245 | A1 | * | 8/2005 | Bonne et al. .................... 429/12 |

(Continued)

FOREIGN PATENT DOCUMENTS

| | | |
|---|---|---|
| EP | 1845572 A1 | 10/2007 |
| WO | WO-2005/004273 A2 | 1/2005 |
| WO | WO-2006113469 A1 | 10/2006 |
| WO | WO-2007/134095 A2 | 11/2007 |

OTHER PUBLICATIONS

PCT Application No. PCT/US2007/085766, International Search Report mailed Apr. 2, 2008, 4 pgs.

(Continued)

*Primary Examiner* — Barbara Gilliam
*Assistant Examiner* — Adam A Arciero
(74) *Attorney, Agent, or Firm* — Schwegman Lundberg & Woessner, P.A.

(57) ABSTRACT

A power generator includes a fuel container adapted to hold a hydrogen containing fuel. A sliding valve is coupled between a fuel cell and a fuel container. A pressure responsive actuator is coupled to the two stage valve and the fuel container.

7 Claims, 2 Drawing Sheets

(56) References Cited

U.S. PATENT DOCUMENTS

| | | | |
|---|---|---|---|
| 2006/0108000 | A1 | 5/2006 | Kaneko et al. |
| 2006/0127722 | A1 | 6/2006 | Nakajima et al. |
| 2006/0134485 | A1 | 6/2006 | Horiuchi et al. |
| 2006/0174952 | A1* | 8/2006 | Curello et al. ............ 137/614.03 |
| 2007/0237995 | A1* | 10/2007 | Eickhoff et al. ................ 429/19 |
| 2007/0271844 | A1 | 11/2007 | Mohring et al. |
| 2008/0107930 | A1 | 5/2008 | Eickhoff et al. |
| 2008/0220300 | A1 | 9/2008 | Jones et al. |
| 2008/0268299 | A1 | 10/2008 | Eickhoff et al. |
| 2009/0236551 | A1 | 9/2009 | Nomichi et al. |
| 2011/0003237 | A1 | 1/2011 | Eickhoff et al. |

OTHER PUBLICATIONS

PCT Application No. PCT/US2007/085766, Written Opinion mailed Apr. 2, 2008, 6 pgs.

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

"U.S. Appl. No. 11/592,692, Preliminary Amendment filed Nov. 3, 2006", 3 pgs.

"U.S. Appl. No. 11/592,692, Non Final Office Action mailed Jan. 21, 2011", 8 pgs.

"European Application Serial No. 07854813.8, Office Action mailed Feb. 9, 2011", 5 pgs.

"U.S. Appl. No. 11/592,692, Non-Final Office Action mailed Jul. 23, 2010", 9 pgs.

"U.S. Appl. No. 11/592,692, Response filed Apr. 28, 2010 to Restriction Requirement mailed Mar. 31, 2010", 7 pgs.

"U.S. Appl. No. 11/592,692, Response filed Oct. 25, 2010 to Non Final Office Action mailed Jul. 23, 2010", 9 pgs.

"U.S. Appl. No. 11/592,692, Restriction Requirement mailed Mar. 31, 2010", 6 pgs.

"U.S. Appl. No. 11/592,692, Response to Rule 312 Amendment mailed Sep. 5, 2012", 2 pgs.

"U.S. Appl. No. 12/829,082, Response filed Oct. 31, 2012 to Non Final Office Action mailed Sep. 24, 2012", 11 pgs.

"U.S. Appl. No. 12/829,082, Non Final Office Action mailed Sep. 24, 2012", 9 pgs.

"European Application Serial No. 07854813.8, Response and Amendment filed Nov. 6, 2012 to Examiner Consultation on Nov. 6, 2012", 6 pgs.

"U.S. Appl. No. 11/592,692, Non Final Office Action mailed Jul. 19, 2011", 13 pgs.

"U.S. Appl. No. 11/592,692, Response filed Apr. 18, 2011", 8 pgs.

"European Application Serial No. 07854813.8, Response filed Jun. 9, 2011 to Office Action mailed Feb. 9, 2011", 7 pgs.

"U.S. Appl. No. 12/829,082, Advisory Action mailed Mar. 4, 2013", 3 pgs.

"U.S. Appl. No. 12/829,082, Final Office Action mailed Dec. 20, 2012", 9 pgs.

"U.S. Appl. No. 12/829,082, Response filed Feb. 20, 2013 to Final Office Action mailed Dec. 20, 2012", 10 pgs.

"U.S. Appl. No. 11/592,692, Notice of Allowance mailed May 31, 2012", 6 pgs.

"U.S. Appl. No. 12/829,082, Preliminary Amendment filed Jul. 1, 2010", 5 pgs.

"European Application Serial No. 07854813.8, Office Action Mailed Dec. 21, 2011", 4 pgs.

"European Application Serial No. 07854813.8, Response filed Apr. 13, 2012 to Office Action mailed Dec. 21, 2012", 6 pgs.

"International Application Serial No. PCT/US2007/085766, International Preliminary Report on Patentability dated Jun. 3, 2009", 6 pgs.

"U.S. Appl. No. 11/592,692, Response flied Oct. 19, 2011 to Non Final Office Action mailed Jul. 19, 2011", 8 pgs.

"U.S. Appl. No. 12/829,082, Notice of Allowance mailed May 20, 2013", 9 pgs.

* cited by examiner

SLIDE VALVE FOR FUEL CELL POWER GENERATOR

BACKGROUND

In some fuel cell based power generators, hydrogen is extracted from a fuel in the presence of water and then is introduced into a fuel cell to produce electricity. Power generators based on hydrogen generators and proton exchange membrane (PEM) fuel cells may contain valves to control the rate at which electricity is generated. Such valves may require precision parts and be very expensive to provide adequate seals when closed. There is a need for a valve that can better control the flow of water, hydrogen and/or oxygen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
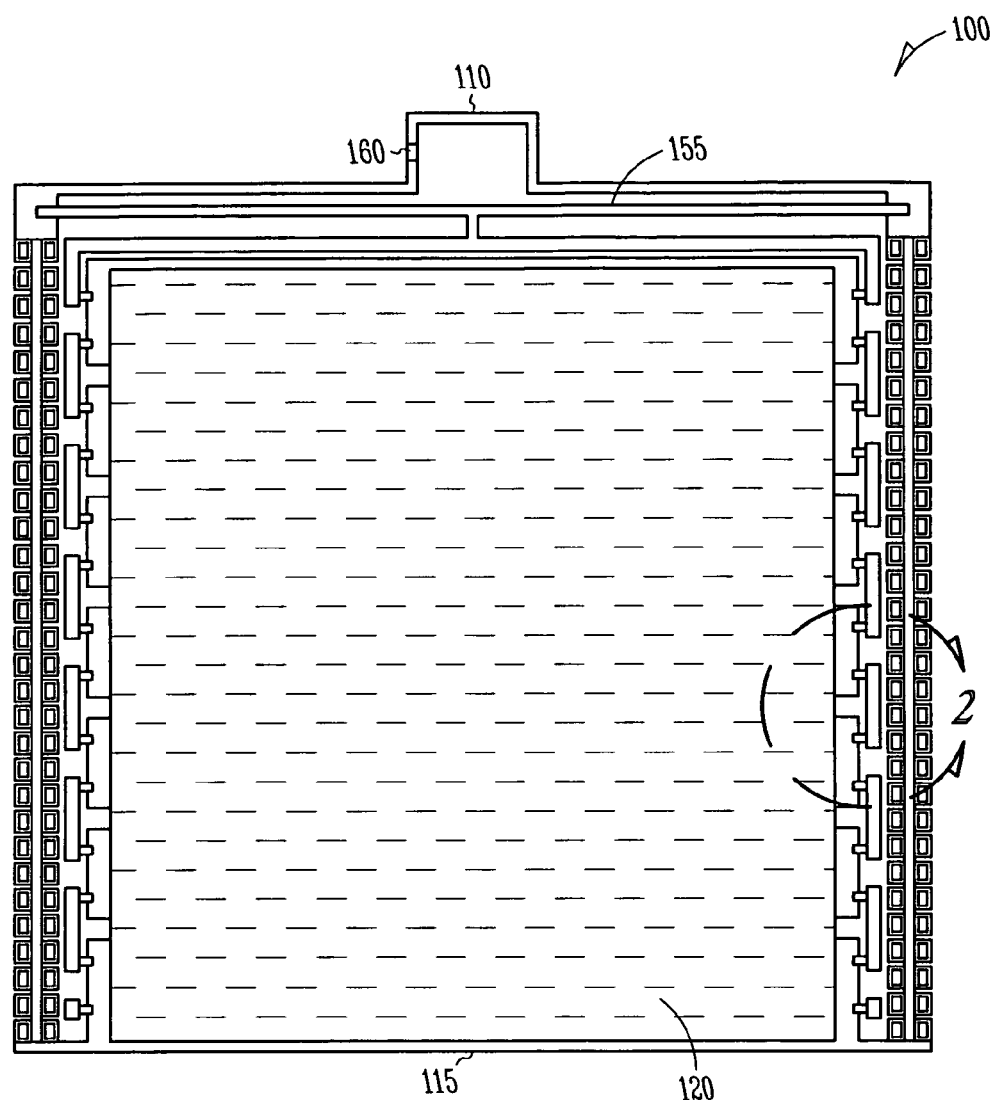
FIG. 1 is a cross section representation of a fuel cell based power generator having a slide valve according to an example embodiment.
Figure 2:
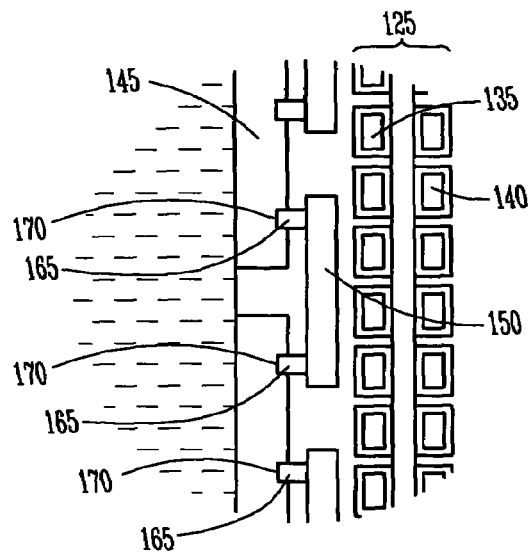
FIG. 2 is a cross section of a portion of the power generator of FIG. 1 illustrating a slide valve and fuel cell stack according to an example embodiment.

FIG. 1 is a cross section representation of a fuel cell based power generator 100 according to an example embodiment. Generator 100 includes a cathode output electrode 110 and an anode output electrode 115. In one embodiment, the generator may be shaped similar to a commercially available dry cell battery, such that it can be substituted for the dry cell battery. A fuel chamber 120 may contain a hydrogen containing fuel that provides hydrogen to a fuel cell stack 125, which is shown in expanded form in FIG. 2, wherein the numbering is consistent with FIG. 1.

Fuel cell stack 125 may include a proton exchange membrane (PEM), catalyst layer, gas diffusion layer, micro porous layer. An anode electrode 135 is coupled to the fuel cell stack 125 between the fuel cell stack 125 and the fuel chamber 120. It is also coupled to the anode output electrode 115. A cathode electrode 140 is coupled to the other side of the fuel cell stack, and is coupled to the cathode output electrode 110. It may also be exposed to ambient conditions.

Between the fuel cell 125 and the hydrogen chamber 120 is a slide valve. The slide valve includes a fixed plate 145 and a movable plate 150 that are coupled in a sliding relationship in one embodiment. A hydrogen and water vapor permeable particulate filter may also be used between the fuel cell and the fuel or fuel chamber 120. In one embodiment, the fixed plate 145 is supported in fixed position proximate or adjacent to the fuel chamber 120, and the movable plate 150 is coupled to a flexible diaphragm 155, that flexes in response to changes in pressure between the hydrogen pressure in the fuel chamber and ambient pressure. A hole 160 provides the diaphragm access to atmospheric pressure. The diaphragm 155 acts as a pressure responsive actuator that controls the slide valve. Each of the fixed plate 145 and movable plate 150 has openings that prevent flow when in a closed position and allow flow when the openings at least partially line up.

In one embodiment the valve responds to a pressure differential between ambient and the inside of the power generator. The fuel cell stack 125 is exposed at a desired pressure differential between hydrogen in the fuel container 120 and ambient.

In one embodiment the power generator is cylindrical in shape and the valve plates are concentric cylinders having mating holes. Fixed plate 145 and movable plate 150 correspond to an inner cylinder and an outer cylinder respectively. When a pressure differential exists across the membrane 155 such as when hydrogen pressure is greater than ambient pressure, the membrane 155 deflects and moves the outer cylinder 150 axially relative to the inner cylinder. The movement of the outer cylinder relative to the inner cylinder causes the holes to become misaligned, which closes the valve.

In one embodiment, o-rings 165 may be used between the plates or cylinders to provide sealing when the holes are misaligned. In one embodiment, the o-rings 165 are disposed within annular grooves 170 on the inner cylinder or fixed plate 145. The o-rings 165 seal against the inside of the outer cylinder or movable plate 150 to seal the cylinders when the holes are misaligned, corresponding to the valve being closed. This provides a substantially sealed closed valve position. When substantially sealed, the conductance of the valve is approximately 1% or less than the fully open conductance.

In one embodiment, the o-rings 165 may be formed of a compressible material and may reside substantially within the annular grooves 170. The compressibility of the material may minimize the effects of variations in size of the plates occurring during normal manufacturing. Nitrile, fluoroelastomers, Ethylene-Propylene, Copolymer of tetrafluoroethylene and propylene, FEP, PFA. O-ring cross section can be circular or rectangular. Wear rings or glide rings may also be used.

The plates in one embodiment are as thin as possible to maintain high conductance, while maintaining sufficient structural rigidity to move without collapse. Thicker sections on the perimeter of the outer plate running parallel to the direction of movement of the valve may be used to improve structural rigidity while maintaining high conductance. Likewise for the inner plate, where thicker sections may be on the inner diameter. O-rings may also have a small cross section in one embodiment to achieve high conductance, while maintaining a good seal between plates.

Figure 3:
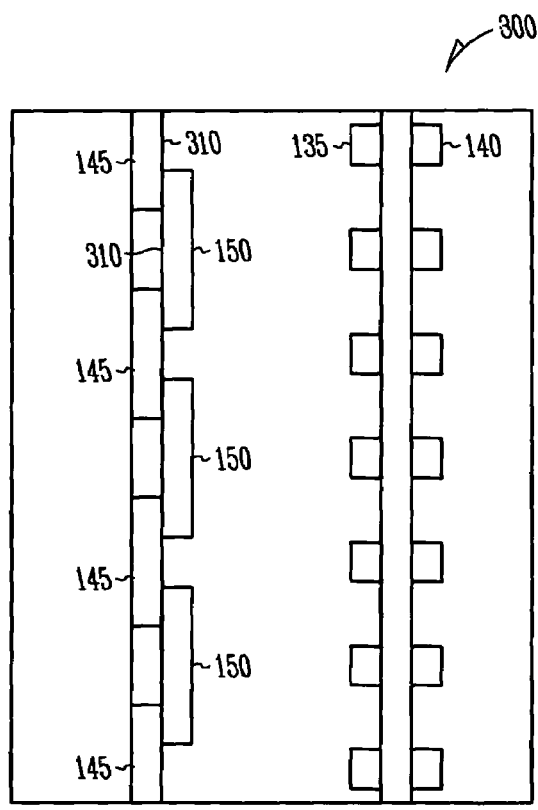
FIG. 3 is a cross section of a portion of the power generator illustrating an alternative slide valve and fuel cell stack according to an example embodiment.

Other shaped plates may also be used, and may generally conform to the shape of the fuel container and fuel cell. The valve plates may alternatively form a low friction contact fit in one embodiment as illustrated at 300 in FIG. 3 to enable relative movement or sliding. An o-ring need not be used in this embodiment. A lubricant 310 may be used to reduce stiction between the plates. As illustrated, the lubricant is at least on the outside of the fixed plate 145 and the inside of the moveable plate 150 where the plates contact each other. The outer dimensions, such as diameter of the fixed plate 145 is very close to the dimensions of the inner dimensions of the moveable plate 150 to form the friction fit.

Material combinations should have low coefficient of friction, for example stainless steel for the outer electrode and Teflon filled acetal for the inner electrode. Many other combinations that provide similar characteristics may be used.

In another embodiment, the outer plate could have a cut in the side, with an inside diameter slightly smaller than the outer diameter of the inner plate, such that the outer plate is expanded slightly when placed over the inner plate, and maintains a sealing force against the inner plate (or o-rings). Additionally, the outer plate could be flexible (rubber) and the inner plate rigid (stailess steel) and as discussed above, the inner diameter of the outer plate could be slightly smaller than the outer diameter of the inner plate, creating a sealing force as the outer plate expands to accommodate the inner plate.

The lubricant may also operate as a sealant. In one embodiment, the lubricant may be graphite or silicon or other lubricant compatible with materials used and the electrochemical reactions occurring. Oil or other hydrocarbon lubricants may also be used.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator comprising:
   a fuel cell;
   a fuel container adapted to hold a hydrogen containing fuel that provides hydrogen to the fuel cell;
   a cylindrical sliding valve positioned between the fuel cell and the fuel container, wherein at least part of the fuel container is contained within the cylindrical sliding valve, and wherein the cylindrical sliding valve is contained completely within the fuel cell,
   the cylindrical sliding valve including;
      a cylindrical inner plate;
      a cylindrical outer plate, coaxially coupled in sliding relationship to the inner plate;
      a plurality of o-rings disposed around the cylindrical inner plate and between the cylindrical inner plate and the cylindrical outer plate, wherein the inner plate has annular grooves and wherein the o-rings are seated in the grooves, wherein the inside diameter of the cylindrical outer plate is sized relative to the outer diameter of the cylindrical inner plate such that the cylindrical outer plate maintains a sealing force against the o-rings; and
      a plurality of alignable holes therethrough;
   a pressure responsive actuator coupled to the cylindrical sliding valve and the fuel container;
   wherein the cylindrical sliding valve provides an open valve position in response to the actuator by sliding at least a portion of the cylindrical outer plate off of at least one o-ring;
   wherein the sliding valve and the o-rings provide a substantially sealed closed valve position in response to the actuator; and
   wherein the sliding valve opens in response to a first differential pressure between hydrogen pressure in the fuel container and ambient pressure in response to the power demand of the fuel cell.

2. The power generator of claim 1 wherein the inner and outer plates have dimensions adapted to provide a moveable friction fit.

3. The power generator of claim 2 wherein the inner and outer plates include a lubricant to reduce friction between them.

4. The power generator of claim 1 and further comprising a hydrogen and water vapor permeable particulate filter positioned to separate the fuel container from fuel.

5. A power generator comprising:
   a fuel cell that converts hydrogen and oxygen to electricity and water;
   a fuel container adapted to hold a hydrogen providing fuel that provides hydrogen to the fuel cell;
   an anode coupled to the fuel cell;
   a cathode coupled to the fuel cell;
   a cylindrical sliding valve positioned between the fuel cell and the fuel container, wherein at least part of the fuel container is contained within the cylindrical sliding valve, and wherein the cylindrical sliding valve is contained completely within the fuel cell,
   the cylindrical sliding valve including;
      a cylindrical inner plate;
      a cylindrical outer plate, coaxially coupled in sliding relationship to the inner plate;
      a plurality of o-rings disposed around the cylindrical inner plate and between the cylindrical inner plate and the cylindrical outer plate, wherein the inner plate has annular grooves and wherein the o-rings are seated in the grooves, wherein the inside diameter of the cylindrical outer plate is sized relative to the outer diameter of the cylindrical inner plate such that the cylindrical outer plate maintains a sealing force against the o-rings; and
      a plurality of alignable holes therethrough;
   a pressure responsive actuator coupled to the cylindrical sliding valve and the fuel container;
   wherein the cylindrical sliding valve provides an open valve position in response to the actuator by sliding at least a portion of the cylindrical outer plate off of at least one o-ring;
   wherein the sliding valve and the o-rings provide a substantially sealed closed valve position in response to the actuator; and
   wherein the sliding valve opens in response to a first differential pressure between hydrogen pressure in the fuel container and ambient pressure in response to the power demand of the fuel cell.

6. The power generator of claim 5 wherein the inner and outer plates have dimensions adapted to provide a moveable friction fit.

7. The power generator of claim 6 wherein the inner and outer plates include a lubricant to reduce friction between them.

* * * * *